Aug. 13, 1946.   W. R. BECK   2,405,636
COAL MINE HAULAGE VEHICLE
Original Filed May 17, 1944   3 Sheets-Sheet 1
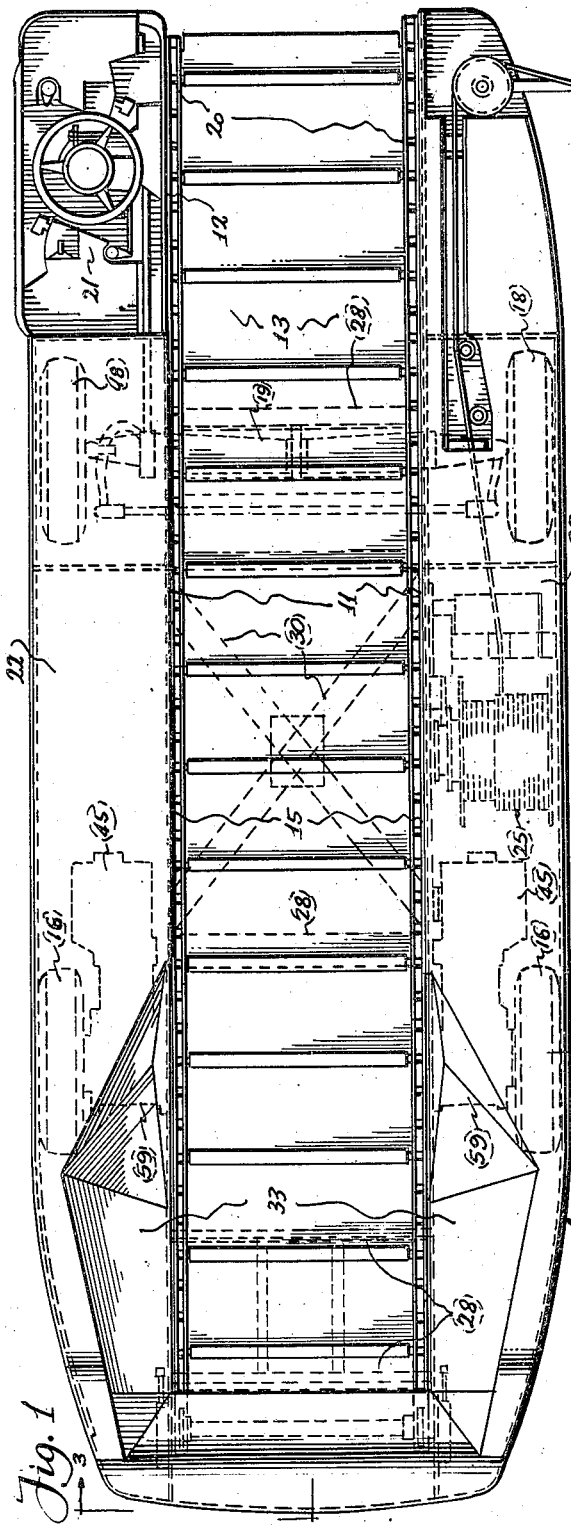
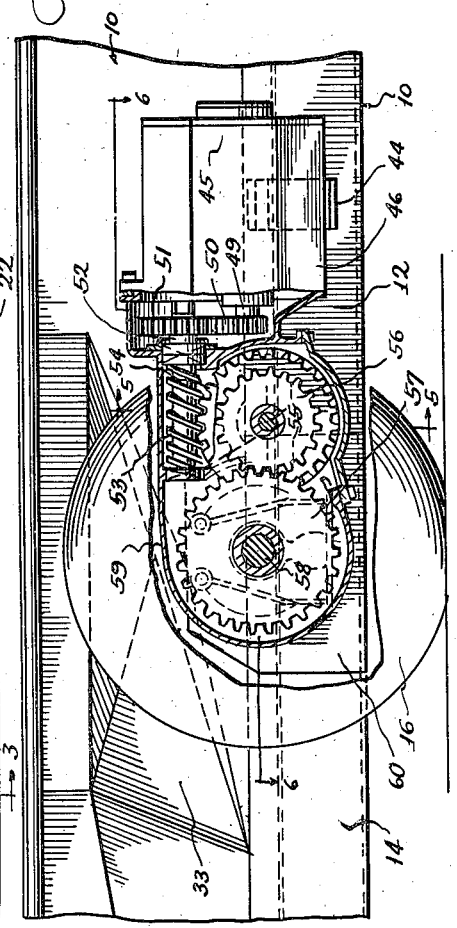
INVENTOR
William R. Beck
Clarence F. Poole
ATTORNEY

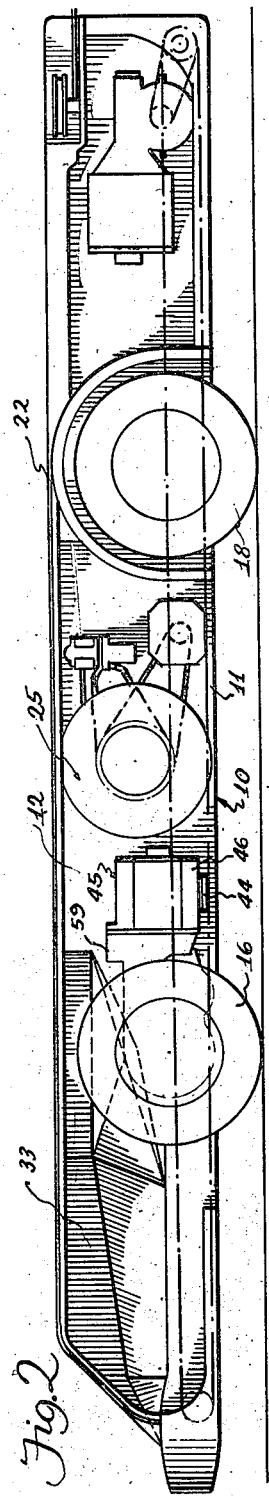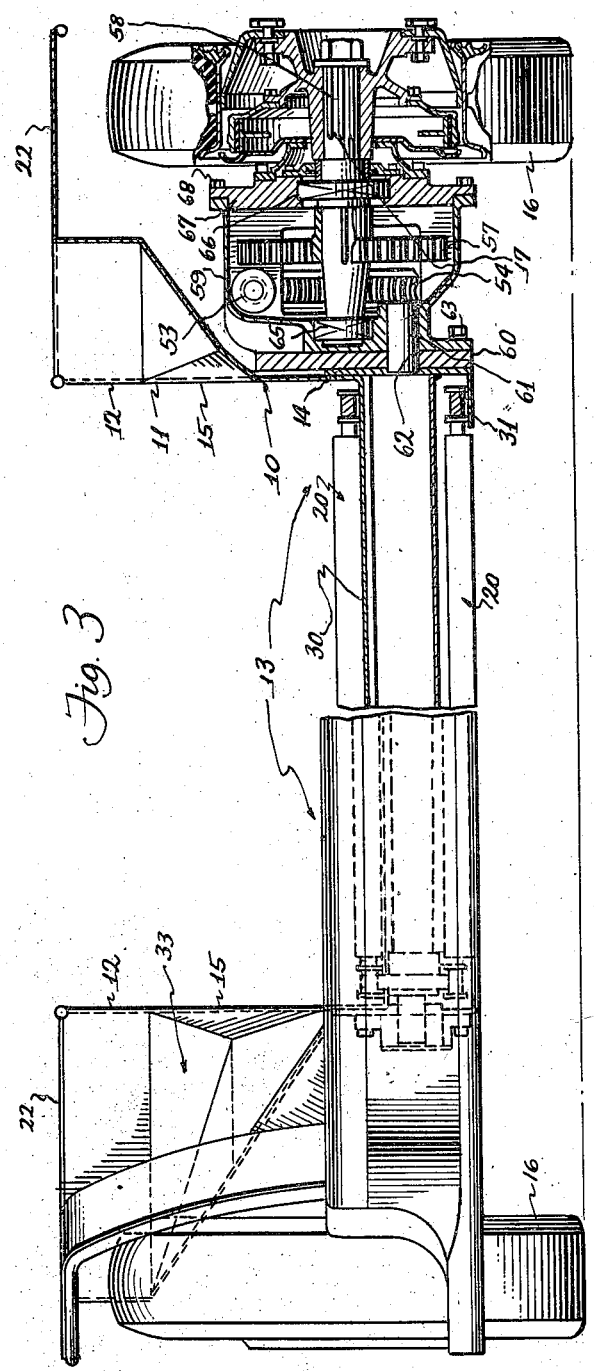

Aug. 13, 1946.  W. R. BECK  2,405,636
COAL MINE HAULAGE VEHICLE
Original Filed May 17, 1944  3 Sheets-Sheet 3

INVENTOR
William R. Beck
Clarence F. Poole
ATTORNEY

Patented Aug. 13, 1946

2,405,636

UNITED STATES PATENT OFFICE 2,405,636

COAL MINE HAULAGE VEHICLE

William R. Beck, Chicago, Ill., assignor to Goodman Manufacturing Company, Chicago, Ill., a corporation of Illinois Original application May 17, 1944, Serial No. 535,903. Divided and this application February 17, 1945, Serial No. 578,494

2 Claims. (Cl. 180—54)

This invention relates to improvements in coal mine haulage vehicles commonly known as shuttle cars or coal buggies, of the kind used for transporting coal from the working face to a main haulage station of a mine.

The object of my invention is to provide an improved and simplified single-wheel power drive structure for a coal mine haulage vehicle including a line drive axle and gearing connections having minimum space requirements.

This application is a division of my application Serial No. 535,903, filed May 17, 1944, which issued as Patent No. 2,399,619 on May 7, 1946.

The invention may best be understood by reference to the accompanying drawings, in which:

Figure 1 is a top plan view of a vehicle constructed in accordance with my invention;

Figure 2 is a view in side elevation of the vehicle of Figure 1;

Figure 3 is an enlarged section taken substantially along line 3—3 of Figure 1;

Figure 4 is a fragmentary detail view of one of the drive elements of the machine with the parts of the gearing shown in section;

Figure 6:
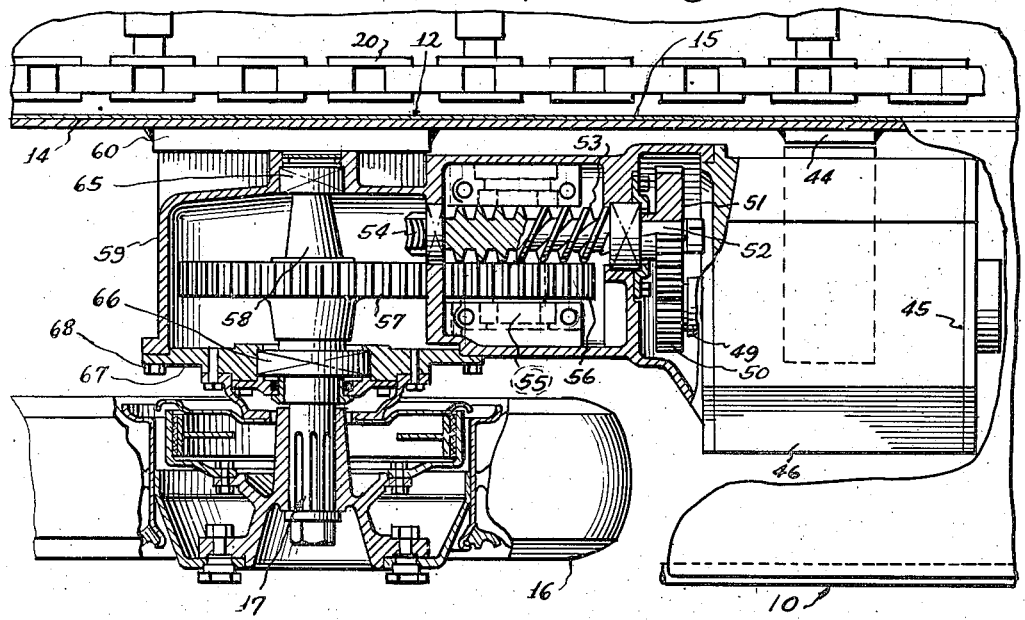
Figure 6 is an enlarged detail section taken on line 6—6 of Figure 4.
Figure 5:
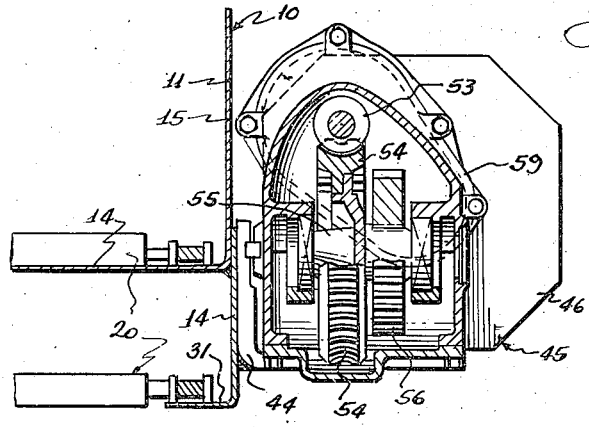
Figure 5 is a detail section taken substantially on line 5—5 of Figure 4.

Referring now to details of the embodiment of my invention illustrated in the drawings, the vehicle indicated generally at 10 comprises an elongated chassis 11 including a pair of vertically disposed laterally spaced beams 12, 12 extending the full length thereof and forming the side walls of a coal carrying compartment indicated at 13. Each of said beams consists generally of a relatively heavy plate 14 forming the lower portion thereof, with a lighter plate 15 welded thereto to form a vertical side wall of the compartment 13, as shown in Figures 3 and 5.

The side walls at the front and central portion of the vehicle are upright, but at the rear end of the vehicle are flared outwardly to form a hopper 33.

The chassis has two rubber-tired drive wheels 16, 16 near the rear end mounted on axle structures 17, 17, which will hereinafter be described in detail. Two rubber-tired steering wheels 18, 18 are disposed near the front end, mounted on an equalizing structure 19, which is substantially similar to that disclosed in my prior Patent No. 2,336,386, so need not be described more fully herein.

An endless chain flight conveyer indicated generally at 20 extends along and forms the bottom of the coal carrying compartment 13 for the full length of the latter, so that the coal can be unloaded mechanically from one end of the vehicle in the usual manner. An operator's platform 21 bearing the usual vehicle control devices, is provided at a forward corner of the vehicle outside of one of the upright compartment walls 12 and forwardly of the adjacent front wheel 18, as shown in Figures 1 and 2.

The side walls 12, 12 have horizontal deck plates 22, 22 extending laterally from their upper edges along opposite sides of the vehicle which form individual wells for the front wheels 18. A cable reel structure indicated generally at 25, is mounted beneath one of the deck plates 22.

The side beams 12 are cross connected by a plurality of suitable frame members 28 extending between the upper and lower flights of the conveyer 20. The bottom of the compartment 13 is defined by a cross plate 30 extending between the side walls 12, and on which the upper flight of the conveyer is supported. In the form shown herein, the cross plate 30 is made integral with the upwardly extending wall portions 15 of the side walls 12. The lower reach of the conveyer is supported on inturned flanges 31, 31 mounted along the lower edge of the side plates 12.

The drive mechanism for each rear wheel 16 consists of an electric motor 45 in casing 46 disposed longitudinally of the machine and forwardly of said wheel. Said casing is suitably supported on the adjacent side beam 12 as by a bracket 44 shown in Figure 5. An armature shaft 49 of the motor is connected by gears 50, 51 to a shaft 52 having a worm 53 thereon, disposed above the armature shaft. The worm 53 is meshed with worm gear 54 fixed on a stub shaft 55. A pinion 56 is also fixed on said stub shaft and meshes with the drive gear 57 fixed on the live axle 58 of wheel 16.

The entire drive gearing just described has bearing support in and is enclosed by a gear casing 59 which is rigidly connected to the front end of the motor casing 46, and is also detachably mounted on a flat base plate 60 suitably fixed to the proximate beam 12, as by welding, and having a supporting pin 61 projecting outwardly therefrom, as shown in Figure 3. The pin 61 is adapted to fit in an aperture 62 formed in the gear casing 59. The latter casing is secured to the base plate by a plurality of bolts 63.

It will be observed that the live axle 58 has its inner end supported by an anti-friction bearing 65 recessed in the inner face of the gear casing 59, while the outer end of said axle is supported by an anti-friction bearing 66 mounted in a closure plate 67, detachably secured to the outer face of the casing 59 by bolts 68. This arrangement permits the entire wheel assembly, including the axle and its drive gear 57, to be readily dismounted from the casing 59, when desired, by removing the bolts 68 and withdrawing said wheel assembly endwise from said casing.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a vehicle for transporting loose material, a main frame including a pair of laterally spaced vertical walls forming the principal longitudinal supporting members of said main frame and also defining the side walls of a material-carrying compartment, a pair of driving wheels at opposite sides of said vehicle, independent drive means for each wheel including a gear housing having a motor secured to one end thereof and gear reduction mechanism journaled in said gear housing and operatively connecting said motor with said wheel, said gear housing having an inner end wall adapted to extend along and be secured to said side wall and having a plate mounted on its outer face to form a closure member therefor, and said gear reduction mechanism including a live axle for said wheel journaled at its inner end in said inner wall of said housing and journaled inwardly of said wheel on said closure plate, permitting removal of said axle and wheel by removal of said closure plate.

2. In a vehicle for transporting loose material, a main frame including a pair of laterally spaced vertical walls forming the principal longitudinal supporting members of said main frame and also defining the side walls of a material-carrying compartment, a pair of driving wheels at opposite sides of said vehicle, independent drive means for each wheel including a gear housing having a motor secured to one end thereof and gear reduction mechanism journaled therein and operatively connecting said motor with said wheel, said gear housing having an inner end wall adapted to extend along and be secured to said side wall and having a plate mounted on its outer face to form a closure member therefor, and said gear reduction mechanism including a live axle for said wheel journaled at its inner end in said inner wall of said housing and journaled inwardly of said wheel on said closure plate, permitting removal of said axle and wheel by removal of said closure plate, and the mounting for said inner wall of said housing on said side wall of said material carrying compartment including a supporting pin projecting outwardly from said side wall and adapted to register for engagement with an apertured portion of said inner end wall.

WILLIAM R. BECK.